US008094553B2

(12) United States Patent
Akita et al.

(10) Patent No.: US 8,094,553 B2
(45) Date of Patent: Jan. 10, 2012

(54) BASE STATION, RADIO TERMINAL AND RADIO COMMUNICATION METHOD

(75) Inventors: Koji Akita, Yokohama (JP); Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 11/814,960

(22) PCT Filed: Mar. 9, 2007

(86) PCT No.: PCT/JP2007/055316
§ 371 (c)(1),
(2), (4) Date: Nov. 3, 2009

(87) PCT Pub. No.: WO2007/102626
PCT Pub. Date: Sep. 13, 2007

(65) Prior Publication Data
US 2010/0157786 A1 Jun. 24, 2010

(30) Foreign Application Priority Data
Mar. 9, 2006 (JP) ................................. 2006-064483

(51) Int. Cl.
*H04B 7/208* (2006.01)
*H04J 3/22* (2006.01)
(52) U.S. Cl. ......... 370/230; 370/344; 370/468; 455/450
(58) Field of Classification Search .................. 370/203, 370/208, 229, 230, 328, 329, 343, 344, 468; 455/450, 452.1, 452.2
See application file for complete search history.

(56) References Cited

U.S. PATENT DOCUMENTS

| 2002/0191533 | A1* | 12/2002 | Chini et al. .................... 370/206 |
| 2004/0202103 | A1* | 10/2004 | Suh et al. ....................... 370/208 |
| 2005/0143125 | A1 | 6/2005 | Maltsev et al. |
| 2010/0255806 | A1* | 10/2010 | Bocquet et al. ............ 455/278.1 |

FOREIGN PATENT DOCUMENTS

| EP | 1 496 659 | 1/2005 |
| GB | 2 415 870 | 1/2006 |
| WO | 02 49306 | 6/2002 |
| WO | 02 052807 | 7/2002 |
| WO | 2005 022810 | 3/2005 |

OTHER PUBLICATIONS

R. Fantacci, et al., "Multiuser Interference Cancellation Receivers for OFDMA Uplink Communications With Carrier Frequency Offset", IEEE Communications Society, pp. 2808-2812, 2004.

* cited by examiner

*Primary Examiner* — Aung S Moe
*Assistant Examiner* — Kerri Rose
(74) *Attorney, Agent, or Firm* — Oblon, Spivak, McClelland, Maier & Neustadt, L.L.P.

(57) ABSTRACT

According to an aspect of the present invention, there is provided with a radio communication method using an OFDMA scheme for uplink communication from a plurality of radio terminals to a base station, including: detecting communication states of the radio terminals; and arranging null subcarriers between subcarriers used by the radio terminals to which frequency bands neighboring on the frequency domain are assigned, depending on the communication states of the radio terminals.

14 Claims, 11 Drawing Sheets

BASE STATION, RADIO TERMINAL AND RADIO COMMUNICATION METHOD

BACKGROUND OF THE INVENTION

1. Field of the Invention

The present invention relates to a base station, radio terminal and radio communication method, and more particularly, to a technique for reducing interference among users when an OFDMA scheme is used for uplink communication from radio terminals to a base station.

2. Related Art

An OFDMA (Orthogonal Frequency Division Multiple Access) scheme is known as a scheme for multiplexing users by assigning subcarriers divided through OFDM (Orthogonal Frequency Division Multiplexing scheme) modulation to different users (radio terminals). In an uplink radio communication system which multiplexes users according to an OFDMA scheme, user signals overlap one another on the frequency domain caused by a frequency offset of each user, Doppler shift or the like. As a result, interference among users may occur. When interference occurs, an error rate performance degrades, and therefore throughput degrades. As a result, the total throughput of all user terminals connected to a certain base station, that is, system throughput degrades.

To avoid this problem, a method of canceling interference using signals received on the base station side is known, as described in a document ("Multiuser Interference Cancellation Receivers for OFDMA Uplink Communications with Carrier Frequency Offset" (R. Fantacci, D. Marabissi, S. Papini, pp 2808 to 2812, IEEE Communications Society Globecom 2004)). However, this method requires complicated calculations to cancel interference. Furthermore, interference may not be totally canceled.

In contrast, as a simple way of reducing interference, a scheme of constantly arranging null subcarriers among users may be considered. This can be considered equivalent to a case where guard bands are provided among users under an FDM scheme. When this scheme is used, interference among users does not occur unless a frequency offset exceeding the widths of pre-arranged null subcarriers or a Doppler shift occurs. For this reason, it is possible to prevent deterioration of system throughput due to interference. However, when no interference occurs, system throughput in this scheme reduces compared to a case where null subcarriers are not arranged.

Thus, the conventional method requires complicated processing when interference is canceled. Furthermore, there is also a problem that system throughput degrades when interference does not occur.

SUMMARY OF THE INVENTION

According to an aspect of the present invention, there is provided with a base station using an OFDMA (Orthogonal Frequency Division Multiple Access) scheme for uplink communication from a plurality of radio terminals, comprising:

a mapping information generator configured to generate mapping information indicating subcarriers assigned to the radio terminals for communications depending on the OFDMA scheme;

a first transmitter configured to transmit the mapping information to the radio terminals;

a receiver configured to receive OFDM signals from the radio terminals;

a communication state detector configured to detect communication states of the radio terminals from the mapping information and the OFDM signals received from the radio terminals;

a null information generator configured to
determine whether or not null signals should be assigned to a part of the subcarriers assigned to the radio terminals from the communication states of the radio terminals and the mapping information,
specify subcarriers to which null signals are to be assigned when it is determined that null signals should be assigned and
generate null information for instructing to assign null signals to the specified subcarriers; and a second transmitter configured to transmit the null information to the radio terminals determined to assign null signals.

According to an aspect of the present invention, there is provided with a radio terminal using an OFDMA scheme for uplink communication to a base station, comprising:

a first receiver configured to receive mapping information indicating subcarriers assigned by the base station from the base station;

a second receiver configured to receive null information instructing to assign null signals to a part of the subcarriers assigned by the base station from the base station;

a data generator configured to generate data to be transmitted to the base station;

a mapping unit configured to assign the data to effective subcarriers which are subcarriers other than the subcarriers indicated in the null information among the subcarriers assigned by the base station and assign null signals to the subcarriers indicated in the null information to generate subcarrier signals;

an IFFT section configured to perform an inverse fast Fourier transform on the subcarrier signals to generate an OFDM signal; and a transmitter configured to transmit the OFDM signal to the base station.

According to an aspect of the present invention, there is provided with a radio terminal using an OFDMA scheme for uplink communication to a base station, comprising:

a first receiver configured to receive mapping information indicating subcarriers assigned by the base station from the base station;

a second receiver configured to receive null information instructing to assign null signals to a part of the subcarriers assigned by the base station from the base station;

a data generator configured to generate coded data to be transmitted to the base station;

a mapping unit configured to assign the coded data to the subcarriers assigned by the base station to generate subcarrier signals;

a data/null switch configured to substitute null signals for subcarrier signals of subcarriers indicated in the null information;

an IFFT section configured to perform an inverse fast Fourier transform on subcarrier signals obtained by the data/null switch to generate an OFDM signal; and a transmitter configured to transmit the OFDM signal to the base station.

According to an aspect of the present invention, there is provided with a radio communication method using an OFDMA scheme for uplink communication from a plurality of radio terminals to a base station, comprising:

receiving OFDM signals from the radio terminals;

detecting communication states of the radio terminals based on mapping information indicating assignment of subcarriers to the radio terminals and OFDM signals received from the radio terminals;

determining whether or not null signals should be assigned to a part of the subcarriers assigned to the radio terminals from detected communication states of the radio terminals; and specifying subcarriers to which null signals are to be assigned when t is determined that null signals should be assigned and;

generating null information for instructing to assign null signals to the specified subcarriers;

transmitting the null information to the radio terminals determined to assign null signals.

According to an aspect of the present invention, there is provided with a radio communication method using an OFDMA scheme for uplink communication from a plurality of radio terminals to a base station, comprising:

detecting communication states of the radio terminals; and arranging null subcarriers between subcarriers used by the radio terminals to which frequency bands neighboring on the frequency domain are assigned, depending on the communication states of the radio terminals.

DETAILED DESCRIPTION OF THE INVENTION

Hereafter, an embodiment of the present invention will be explained more specifically with reference to the attached drawings.

Figure 1:
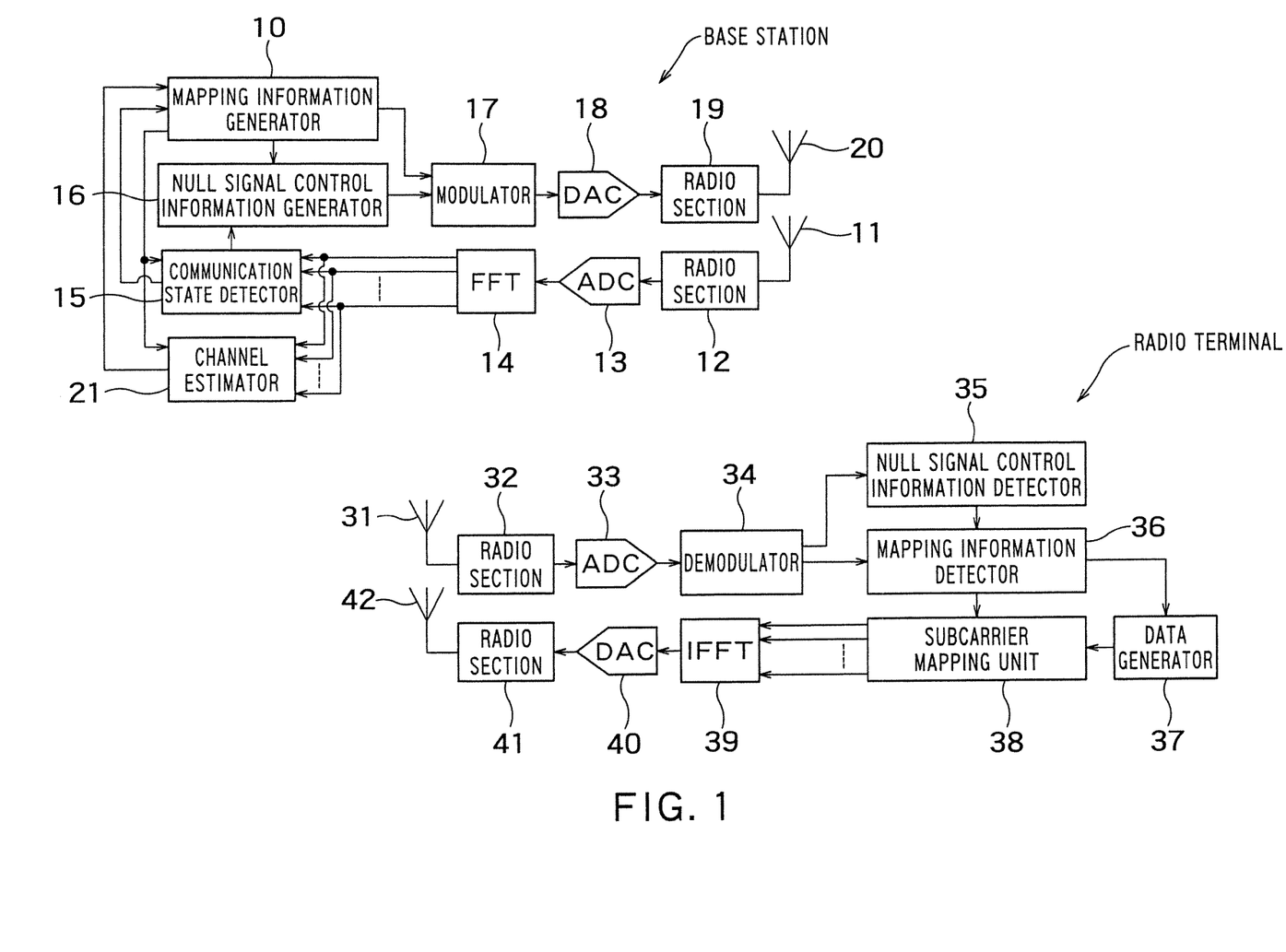
FIG. 1 is a block diagram showing an example of a radio communication system according to a first embodiment.

FIG. 1 is a block diagram showing an example of the configuration of a radio communication system according to a first embodiment of the present invention. This radio communication system is provided with a base station and radio terminals. A communication in an uplink direction from the radio terminal to the base station is carried out according to an OFDMA (Orthogonal Frequency Division Multiple Access) scheme, while a communication is carried out in a downlink direction from the base station to the radio terminal according to an arbitrary communication scheme.

A mapping information generator 10 of the base station generates mapping information indicating to which subcarrier each user (radio terminal) should be assigned for the uplink communication from the radio terminal to the base station. That is, the mapping information generator 10 determines to which subcarrier each user should be assigned for the uplink communication from the radio terminal to the base station and generates mapping information indicating the subcarriers assigned to the respective users. To generate mapping information, this embodiment uses channel information of each user (information on a subcarrier appropriate for each user) estimated by a channel estimator 21 and communication quality information of each user (e.g., including throughput requested by each user or the like) detected by a communication state detector 15. However, the method of generating mapping information is not limited to this. The mapping information generated by mapping information generator 10 is inputted to a modulator 17, a null signal control information generator (null information generator) 16, the communication state detector 15 and the channel estimator 21.

FIG. 3 to FIG. 6 show specific examples of mapping information.

Figure 3:
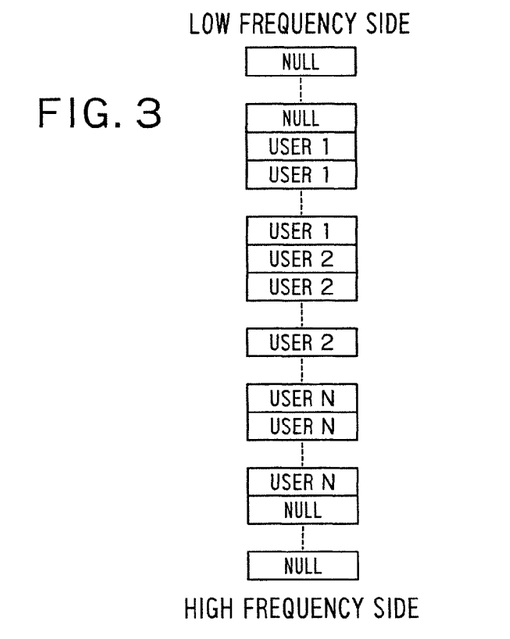
FIG. 3 illustrates a first example of mapping information.

FIG. 3 shows an example showing user assignment to each subcarrier as mapping information. A null subcarrier on the low frequency side at the top in the figure and a null subcarrier on the high frequency side at the bottom in the figure are intended to prevent interference with frequency bands used by other systems.

Figure 4:
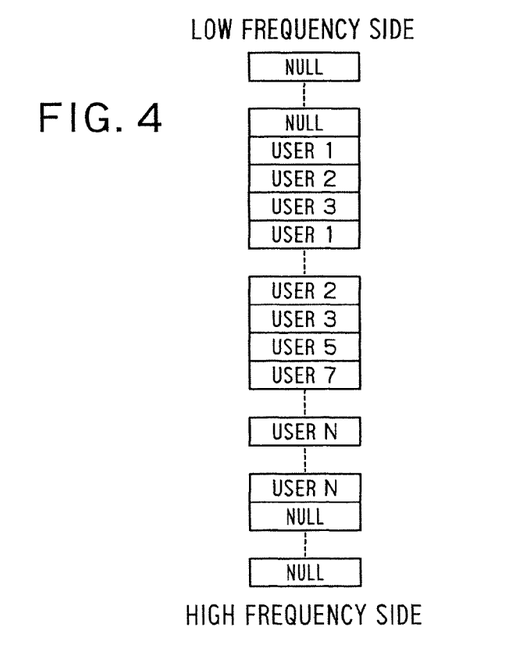
FIG. 4 illustrates a second example of mapping information.

FIG. 4 shows an example where subcarriers to be assigned to users need not always be continuous.

Figure 5:
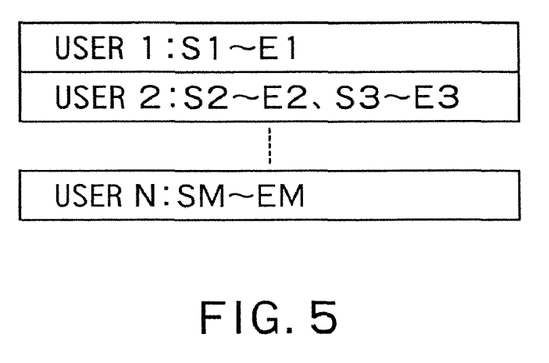
FIG. 5 illustrates a third example of mapping information.

FIG. 5 shows an example where subcarriers to be assigned to users are specified by subcarrier numbers as ranges. For example, "user 1: S1 to E1" indicates that a subcarrier group in a range of subcarrier number S1 to subcarrier number E1 are assigned to user 1.

Figure 6:
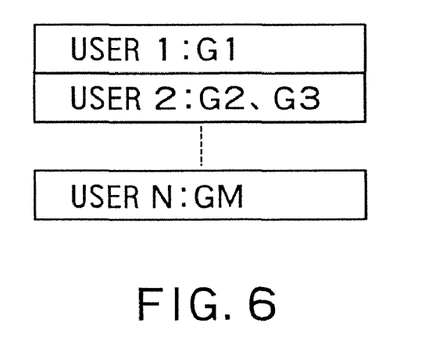
FIG. 6 illustrates a fourth example of mapping information.
Figure 7:
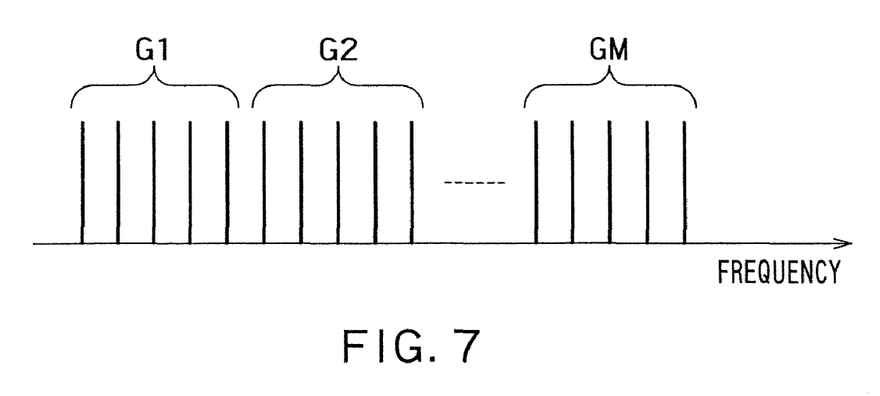
FIG. 7 illustrates a first example of a grouping method.
Figure 8:
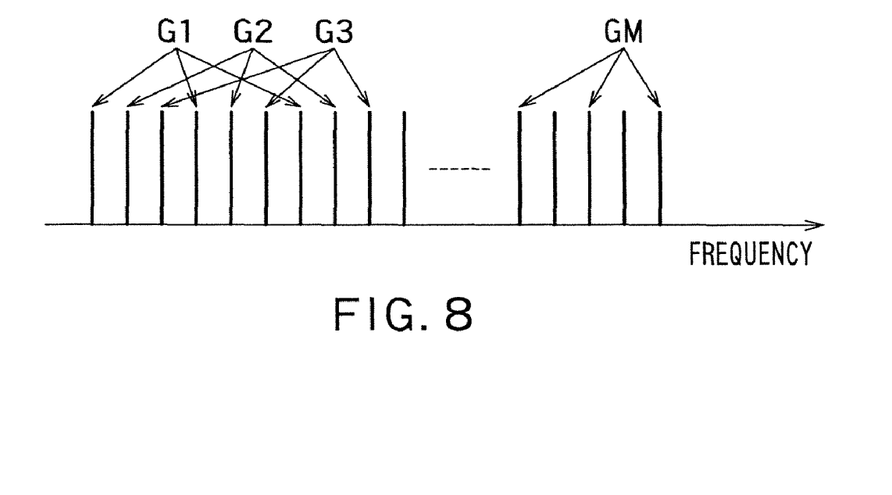
FIG. 8 illustrates a second example of the grouping method.

FIG. 6 shows an example where subcarriers to be assigned to users are specified by group numbers. G1, G2, G3 ... are corresponding to group numbers and each group number is associated with subcarriers beforehand. Examples of the correspondence between group numbers and subcarriers are shown in FIG. 7 and FIG. 8. As shown in FIG. 7, a group of contiguous subcarriers may be considered as one group or as shown in FIG. 8, discrete subcarriers may be brought together into one group.

An antenna 11 of the base station receives a set of OFDM signals from each radio terminal as an OFDMA signal. The received OFDMA signal is converted to a baseband analog signal by a radio section 12 and converted to a baseband digital signal by an ADC (Analog Digital Converter) 13. The baseband digital signal is transformed into signals in subcarrier units by an FFT (Fast Fourier Transform) section 14 and inputted to the communication state detector 15 and channel estimator 21. The subcarrier signals to which user data are assigned are subjected to demodulation processing by a demodulation section (not shown) after the FFT section 14 and passed to an application.

The channel estimator 21 estimates the state of the channels using the subcarrier signals inputted from the FFT section 14 and determines subcarriers best suited to the respective users. The channel estimator 21 passes the subcarriers determined as best suited to the respective users to the mapping information generator 10 as channel information. The state of the channels is estimated by detecting, for example, EVM (Error Vector Magnitude) or reception power from the subcarrier signals. As another method, information indicating the state of the channels measured by the radio terminals may also be acquired by demodulating subcarrier signals.

The communication state detector 15 separates the subcarrier signals inputted from the FFT section 14 for each user based on the mapping information inputted from the mapping information generator 10 and detects the communication states of the respective users. The information indicating the communication states of the respective users is inputted to the null signal control information generator 16 and mapping information generator 10. Examples of the information indicating the communication states of the respective users include the users' carrier frequency information, users' moving speed information, received signal power information of the respective users, information on the amount of interference among the users and communication quality information requested by the users. The method of detecting the respective communication states will be explained in detail later.

The null signal control information generator 16 generates null signal control information (null information) based on the communication states of the respective users inputted from the communication state detector 15 and the mapping information inputted from the mapping information generator 10. The null signal control information is information specifying the parts to be null subcarriers (subcarriers to which null signals should be assigned) of the subcarriers assigned to the respective users. The null signal control information generated by the null signal control information generator 16 is inputted to the modulator 17. The details of the method of generating the null signal control information will be described later.

Figure 9:
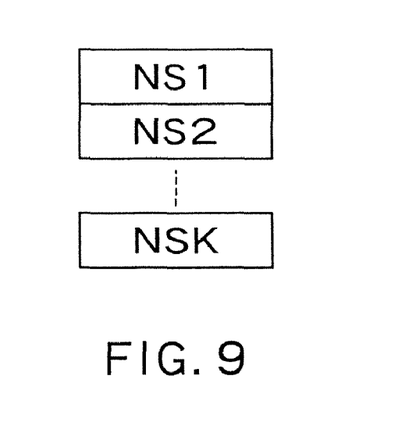
FIG. 9 illustrates a first example of null signal control information.
Figure 10:
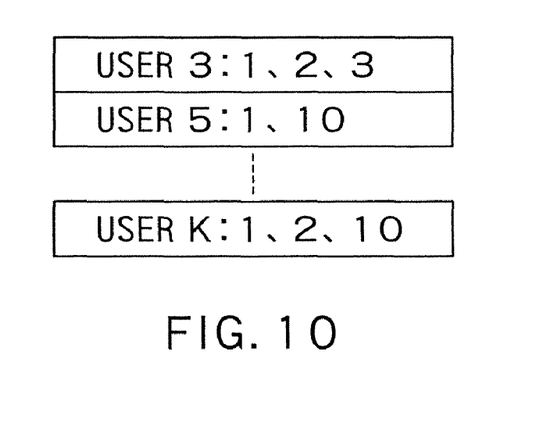
FIG. 10 illustrates a second example of null signal control information.
Figure 11:
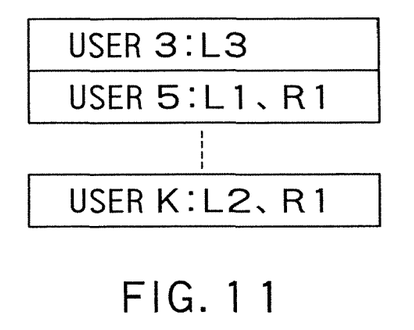
FIG. 11 illustrates a third example of null signal control information.

FIG. 9 to FIG. 11 show specific examples of the null signal control information.

FIG. 9 shows an example where subcarrier numbers to which null signals are assigned are specified as the null signal control information. This example shows that subcarriers with numbers shown as NS1, NS2, . . . NSK are set to null.

FIG. 10 shows an example where subcarrier numbers are specified in the subcarriers assigned to the respective users. For example, "user 3: 1, 2, 3" indicates that the first, second and third subcarriers counted from the lower frequency side of the subcarriers assigned to user 3 are set to null.

Figure 12:
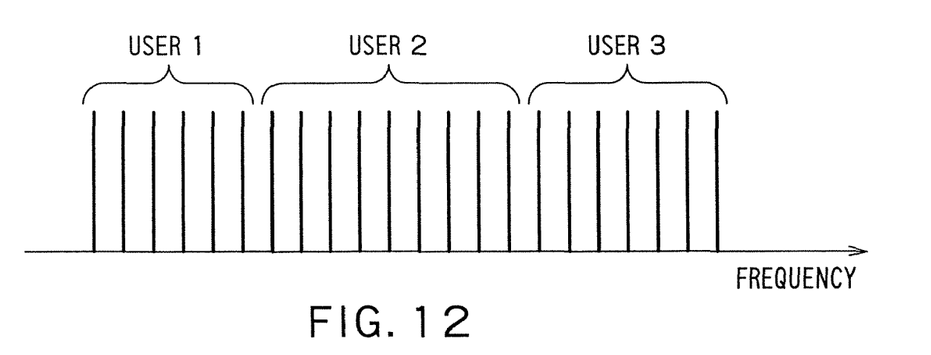
FIG. 12 illustrates an example of assignment of subcarriers to users.
Figure 13:
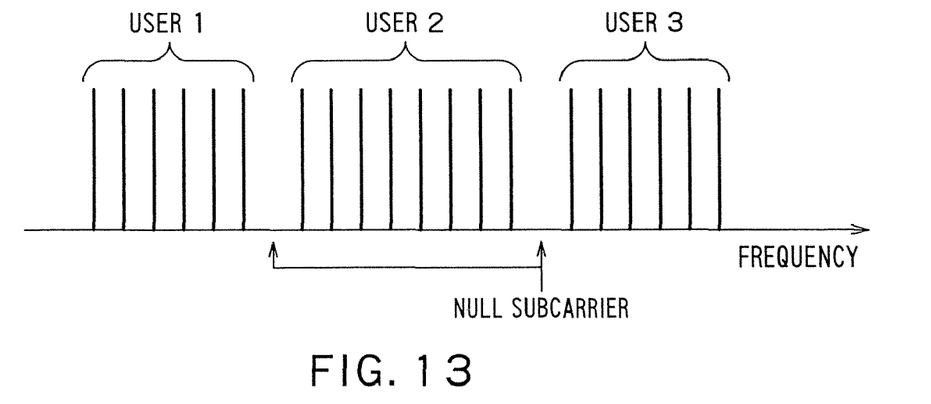
FIG. 13 illustrates an example of assignment of subcarriers to users when null signals are assigned.

FIG. 11 shows an example where null signals are only assigned to both ends of the subcarriers assigned to the respective users, the number of left ends and the number of right ends are specified. For example, "user 5: L1, R1" indicates that of the subcarriers assigned to user 5, one subcarrier on the low frequency side (left side) and one subcarrier on the high frequency side (right side) are set to null subcarriers. When, for example, subcarriers are assigned to the respective users as shown in FIG. 12, if it is assumed that null signal control information of "user 2: L1, R1" is generated, assignment of subcarriers for users 1 to 3 is as shown in FIG. 13.

The modulator 17 modulates the null signal control information inputted from the null signal control information generator 16 and the mapping information inputted from the mapping information generator 10. Furthermore, when data for each user (e.g., image data, audio data, packet data or the like) is inputted, the data for each user is also modulated. The modulated signals are converted to a baseband analog signal by a DAC (Digital Analog Converter) 18 and transmitted to the radio terminals through a radio section 19 and an antenna 20.

Here, the mapping information is considered to have a greater amount of data than the null signal control information. Therefore, instead of sending the mapping information and null signal control information with the same frequency (or number of times), it is possible to send the mapping information with lower frequency and send the null signal control information with higher frequency. For example, it is possible send the mapping information one time while sending the null signal control information five times. By so doing, it is possible to reduce overhead required for control information.

Furthermore, it is also possible to send mapping information with subcarriers commonly used for all users and send the null signal control information using subcarriers assigned to the users to whom null signals are assigned (e.g., when downlink communication is OFDMA, FDM). By so doing, null signal control information will not be sent to users to whom null signals are not assigned, and therefore it is possible to reduce overhead required for control information for users to whom null signals are not assigned.

An antenna 31 of the radio terminal receives signals from the base station, the signals received are converted to a baseband analog signal by a radio section 32, converted to a baseband digital signal by an ADC 33 and demodulated by a demodulator 34.

A null signal control information detector 35 detects null signal control information from the demodulated signals and inputs the detected null signal control information to a mapping information detector 36.

The mapping information detector 36 detects mapping information from the demodulated signals and detects information on the subcarriers assigned to the radio terminal (user) from the detected mapping information. The mapping information detector 36 detects the subcarriers assigned to the radio terminal deprived of null subcarriers indicated by the null signal control information as effective subcarriers and inputs information on the detected effective subcarriers to a subcarrier mapping unit 38. Furthermore, the mapping information detector 36 inputs information indicating the number of effective subcarriers to a data generator 37.

The data generator 37 generates data to be transmitted to the base station and outputs the data generated (e.g., subjected to coding processing, orthogonal modulation or the like) to the subcarrier mapping unit 38. In this case, the data generator 37 adjusts the amount of data to be outputted based on the information indicating the number of effective subcarriers inputted from the mapping information detector 36. The adjustment of the amount of data involves a change of the amount of bit data, change of the coding rate and change of the modulation multivalue number or the like. The data adjusted in this way is output to the subcarrier mapping unit 38.

The subcarrier mapping unit 38 maps the data inputted from the data generator 37 to the effective subcarriers according to the information on the effective subcarriers inputted from the mapping information detector 36. Null signals are mapped to subcarriers other than the effective subcarriers of the subcarriers assigned to the radio terminal.

The mapped data is subjected to an inverse fast Fourier transform by an IFFT (inverse fast Fourier transform) section 39 to a signal in time domain and an OFDM signal is thereby generated. The OFDM signal is converted to a baseband analog signal by a DAC 40 and transmitted to the base station through a radio section 41 and an antenna 42. When null signals are assigned to some subcarriers, it is possible to increase signal power of subcarriers (effective subcarriers) to which no null signals are assigned by an amount of signal power attenuated through the assignment of the null signals. For example, if 10 subcarriers are assigned to a user and one null signal is assigned to each of subcarriers at both ends, it is possible to increase the power of each effective subcarrier to power 10/(10-2) times the power when no null signals are assigned. That is, this is equivalent to the fact that the total power of subcarriers assigned to the radio terminal is kept constant.

In the radio communication system configured in this way, null signals can be assigned only when assignment of null signals is necessary according to the communication situation of each user, and therefore it is possible to avoid the system throughput from degrading when there is no interference among users.

Figure 2:
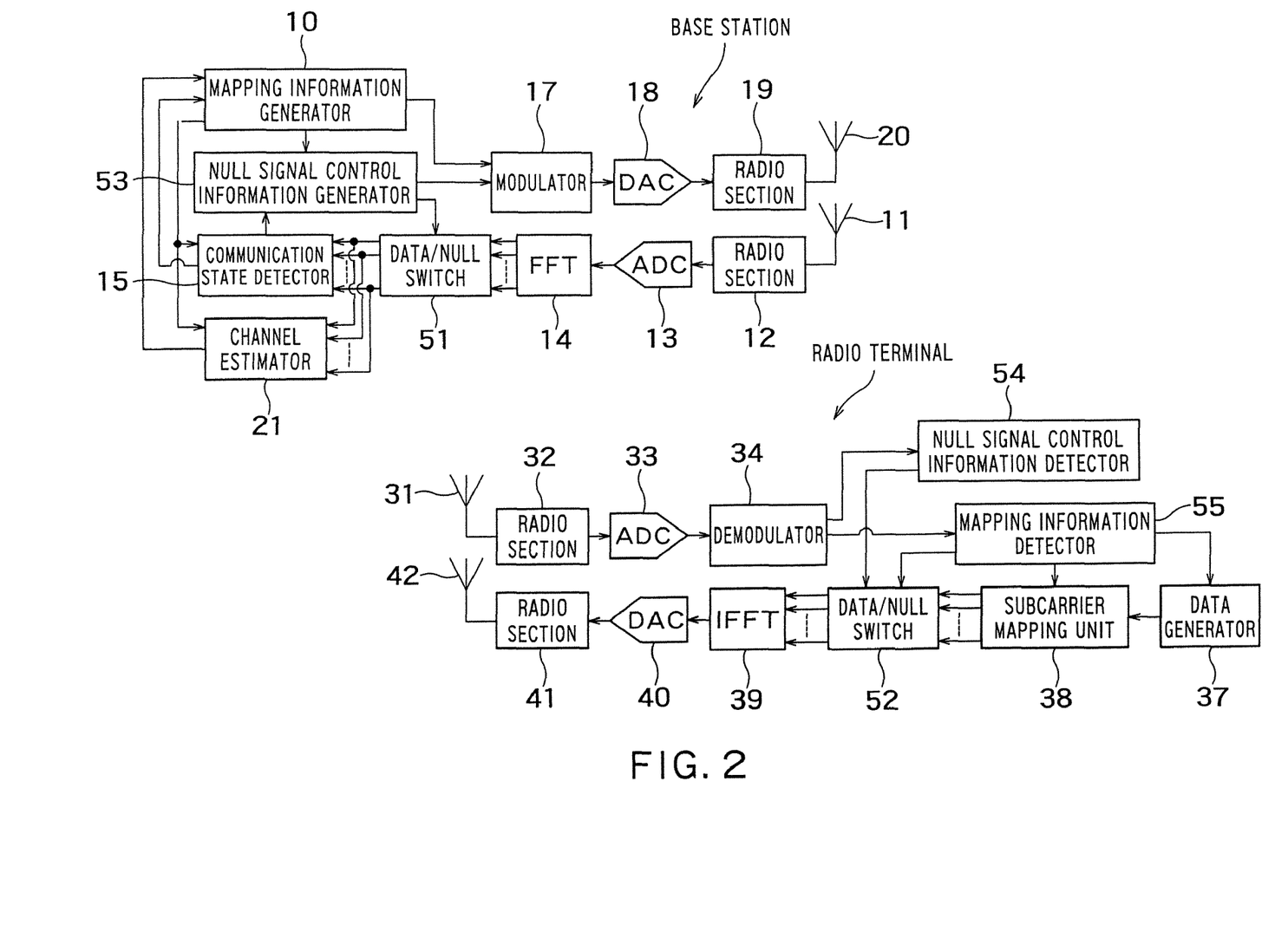
FIG. 2 is a block diagram showing an example of a radio communication system according to a second embodiment.

FIG. 2 is a block diagram showing an example of the configuration of a radio communication system according to a second embodiment of the present invention. Parts equivalent to those in the first embodiment are assigned the same reference numerals and overlapping explanations will be omitted.

A null signal control information generator 53 at a base station generates null signal control information based on information indicating communication states of respective users inputted from a communication state detector 15 and mapping information inputted from a mapping information generator 10 as in the case of the first embodiment. The null signal control information generator 53 inputs the null signal control information generated to a modulator 17 and data/null switch 51.

The data/null switch 51 substitutes null signals for subcarrier signals to which null signals are assigned of the subcarrier signals inputted from an FFT section 14 based on the null signal control information inputted from the null signal control information generator 53. That is, interference given on null subcarriers on a communication path is canceled. It may be also possible to demodulate data for each user using the signals outputted from the data/null switch 51. The signals outputted from the data/null switch 51 are inputted to the communication state detector 15 and a channel estimator 21. As in the case of the first embodiment, the communication information detector 15 detects the communication states of the respective users and the channel estimator 21 generates channel information on the respective users.

A null signal control information detector 54 at a radio terminal detects null signal control information from signals demodulated by a demodulator 34 and inputs the detected null signal control information to a data/null switch 52. Unlike the first embodiment, the null signal control information is not inputted to a mapping information detector 55.

The mapping information detector 55 detects mapping information from the signals demodulated by the demodulator 34 and detects information on subcarriers assigned to the user of the radio terminal based on the detected mapping information. The mapping information detector 55 inputs the information on the detected subcarriers to a subcarrier mapping unit 38. Furthermore, the mapping information detector 55 inputs information indicating the number of subcarriers assigned to the user of the radio terminal to a data generator 37.

The data generator 37 generates data to be transmitted to the base station and outputs the data generated (e.g., subjected to coding processing, orthogonal modulation or the like) to the subcarrier mapping unit 38. In this case, the data generator 37 adjusts the amount of data based on the information indicating the number of subcarriers inputted from the mapping information detector 55 and adjusts the amount of data.

The subcarrier mapping unit 38 maps the data inputted from the data generator 37 to subcarriers assigned to the user based on the information on the subcarriers inputted from the mapping information detector 55. The mapped data is inputted to the data/null switch 52.

The data/null switch 52 substitutes null signals for subcarriers to which null signals are to be assigned based on the null signal control information inputted from the null signal control information detector 35. Based on same principle of puncturing, the receiving side (base station side) can also perform decoding by substituting null signals for the subcarriers. The signals outputted from the data/null switch 52 are converted to signals in time domain by an IFFT section 39, converted to a baseband analog signal by a DAC 40 and transmitted to the base station through a radio section 41 and an antenna 42.

In the radio communication system configured as shown above, a data rate is determined based on only the mapping information, and therefore even when the contents of the null signal control information are changed, the data rate is kept. Furthermore, even when the contents of the null signal control information are changed, the data generator 37 need not readjust the amount of data.

Figure 16:
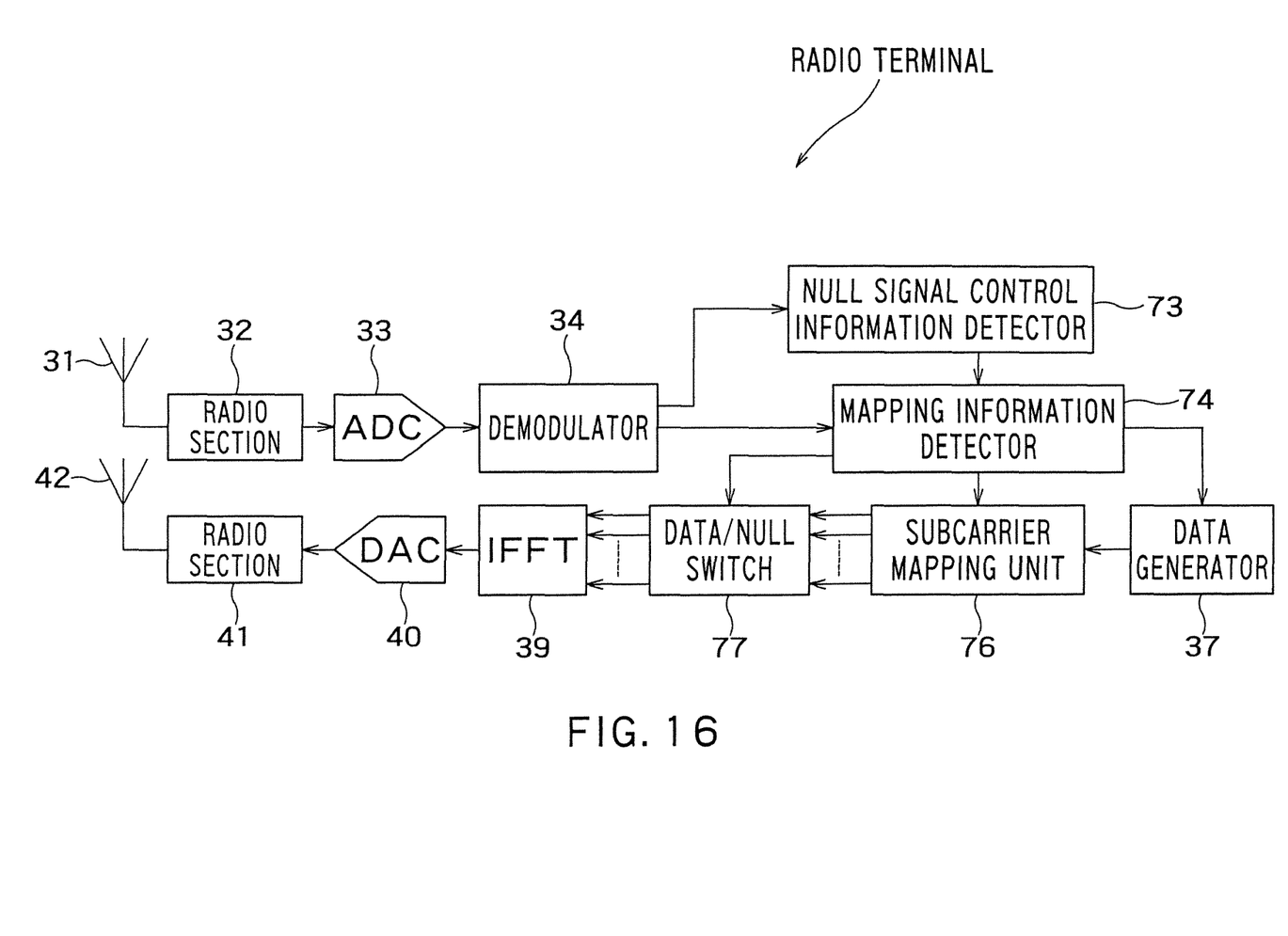
FIG. 16 is a block diagram showing another example of a radio terminal.

Here, the configuration of a radio terminal shown in FIG. 16 may also be used instead of the configuration of the radio terminal shown in FIG. 2. This configuration is particularly suitable for when a data generator 37 performs coding on data through systematic coding (e.g., turbo coding, LDPC coding) as the coding scheme.

A mapping information detector 74 receives null signal control information from a null signal control information detector 73 and receives mapping information from a demodulator 34. The mapping information detector 74 reports the number of subcarriers indicated in the mapping information to the data generator 37. The data generator 37 generates systematic-coded data (including information bits and parity bits) and outputs it to a subcarrier mapping unit 76. The data generator 37 adjusts the amount of data according to the number of subcarriers reported. The mapping information detector 74 controls the subcarrier mapping unit 76 so that parity bits are preferentially assigned to subcarriers indicated by the null signal control information and information bits are preferentially assigned to effective subcarriers. A data/null switch 77 receives the null signal control information from the mapping information detector 74 and substitutes null signals for the signals of the subcarriers indicated in this information. In this way, by preferentially assigning parity bits to subcarriers indicated by the null signal control information, accurate decoding can be expected on the base station side.

Hereinafter, an example of operation of the communication state detector 15 in the first and second embodiments and the method of generating the null signal control information by the null signal control information generator 16 will be explained in detail.

Figure 15:
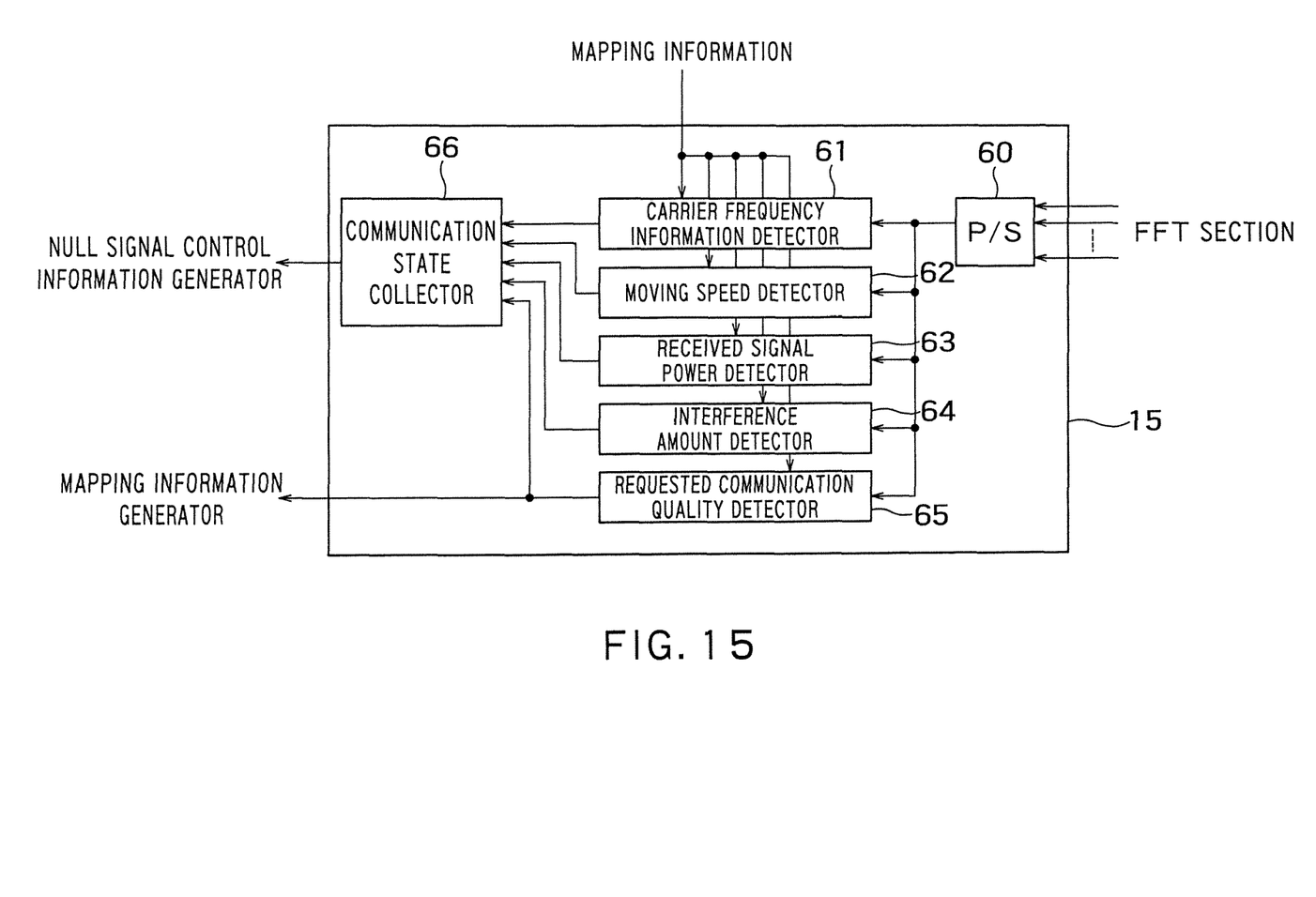
FIG. 15 is a block diagram showing a communication state detector in detail.

First, an example of operation of the communication state detector 15 will be explained using FIG. 15 which shows an example of the detailed configuration of the communication state detector 15.

The communication state detector 15 detects the communication states of the respective users. Examples of the users' communication states include the users' carrier frequency information, users' moving speed information, communication quality information requested by the users, received signal power information of the respective users and information on the amount of interference among the users.

A carrier frequency information detector 61 detects carrier frequency information on the users based on the mapping information inputted from the mapping information generator 10 and the subcarrier signals inputted from the FFT section 14 through a parallel/serial conversion section (P/S section) 60. Pilot signals made up of known signals are generally inserted into some of the signals transmitted from the users through uplink communication. A subcarrier assigned a pilot signal is called a "pilot subcarrier." By measuring the amount of phase variation of this pilot subcarrier, it is possible to detect the amount of deviation (amount of offset) of the carrier frequency that the user is using for transmission from the carrier frequency (proper frequency) that should originally be used and the direction of deviation. A combination of the amount of deviation (amount of offset) and the direction of deviation corresponds to an offset value.

Figure 17:
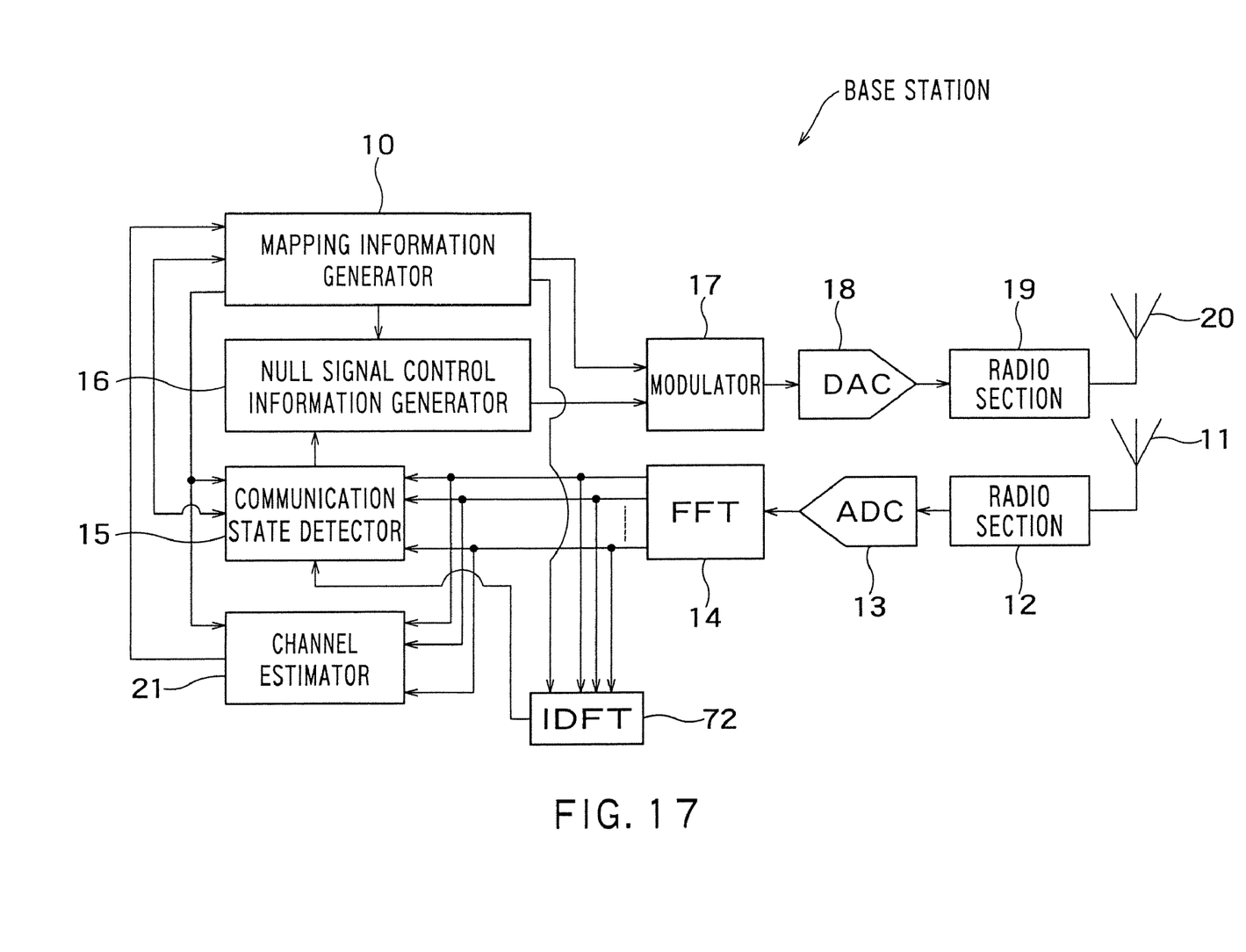
FIG. 17 is a block diagram showing another example of a base station.
Figure 18:
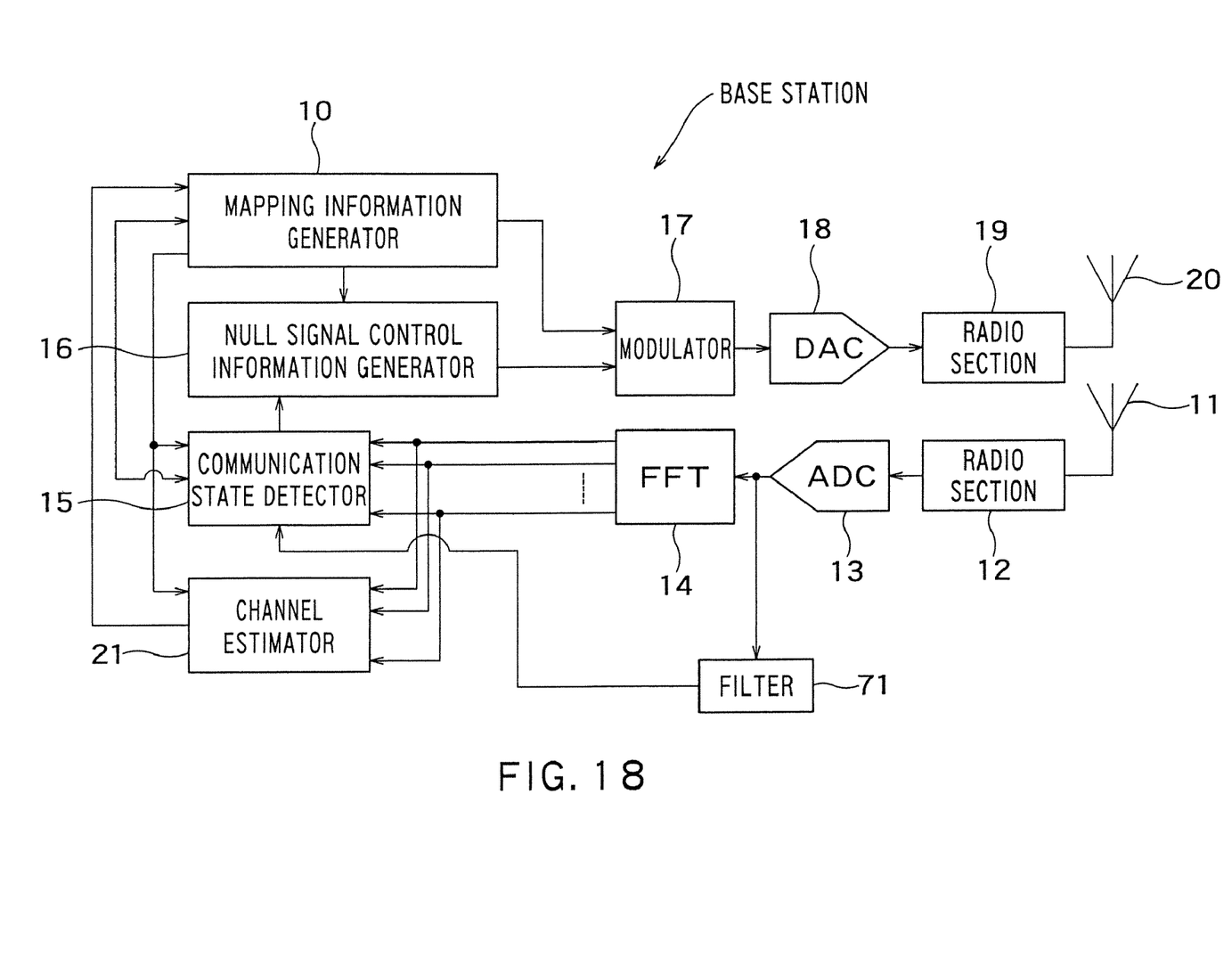
FIG. 18 is a block diagram showing a further example of a base station.

Furthermore, it is also possible to measure the amount of deviation of the carrier frequency and the direction of deviation by sending same time waveform from the radio terminal to the base station a plurality of times at short time intervals and measuring the amount of variation of these time waveforms. In this case, the configuration of the base station shown in FIG. 17 or FIG. 18 can be used. In FIG. 18, a filter 71 for separating signals of each user based on mapping information is connected to the output of an ADC 13 and signals outputted from the filter 71 are inputted to the carrier frequency information detector 61. In FIG. 17, an IDFT (Inverse Discrete Fourier Transform) section 72 is connected to the outputs of an FFT section 14. The IDFT section 72 carries out an inverse discrete Fourier transform on subcarrier signals outputted from the FFT section 14 for each user based on the mapping information and inputs the signals subjected to the inverse discrete Fourier transform to the carrier frequency information detector 61.

A moving speed detector 62 detects the moving speed of the radio terminals based on the mapping information inputted from the mapping information generator 10 and the subcarrier signals inputted from the FFT section 14 through the P/S section 60. When the moving speed is high, variation amount of amplitude and phase of the signal generally increase. Thus, by detecting the variation amount of the amplitude and the phase of pilot subcarriers to which known signals are assigned, it is possible to estimate the moving speed. Or it is also possible to provide a sensor for detecting the moving speed on the radio terminal side and report the value detected here to the base station side. In this case, the moving speed detector 62 can also demodulate the subcarrier signals.

A received signal power detector 63 detects received signal power for each user based on the mapping information inputted from the mapping information generator 10 and the subcarrier signals inputted from the FFT section 14 through the P/S section 60. The sum total of power of all or some subcarriers assigned to the user is calculated and the calculated value is regarded as the received signal power of the user.

An interference amount detector 64 detects the amount of interference among users based on the mapping information inputted from the mapping information generator 10 and the subcarrier signals inputted from the FFT section 14 through the P/S section 60. For example, suppose EVM (Error Vector Magnitude) of subcarriers adjacent to subcarriers assigned to an other user adjacent to a certain user on the frequency domain of the subcarriers used by the certain user is first EVM and EVM of the remaining subcarriers of the subcarriers used by the certain user is second EVM. In this case, the difference between the first EVM and second EVM is detected as the amount of interference among the users.

A requested communication quality detector 65 demodulates the subcarrier signals inputted from the FFT section 14 through the P/S section 60 based on the mapping information inputted from the mapping information generator 10 and detects the communication quality information requested by the user. Examples of the communication quality information requested by the user include throughput and amount of delay of data (e.g., amount of delay of data with respect to the time at which reception should originally be completed). The communication quality information requested by the user is sent from the radio terminal to the base station as part of the data using the subcarriers assigned to each user.

A communication state collector 66 outputs any one or a combination of several pieces of information generated by the carrier frequency information detector 61, moving speed detector 62, received signal power detector 63, interference amount detector 64 and requested communication quality detector 65 to the null signal control information generator 16.

Next, the method whereby the null signal control information generator 16 generates null signal control information using the communication states of the respective users will be explained.

As described above, examples of the information indicating the communication states of the respective users include the users' carrier frequency information, users' moving speed information, received signal power information of the respective users, information on the amount of interference among the users and communication quality information requested by the users. Examples of generating null signal control information for such information will be explained.

As described above, the users' carrier frequency information includes an amount of offset from the originally intended carrier frequency and the direction of deviation (offset value). When a carrier frequency offset exists, interference may occur among neighboring users and throughput may reduce. For example, consider user 1 and user 2 whose subcarriers are adjacent to each other. Suppose user 1 is disposed on the minus side (low frequency side) on the frequency domain compared to user 2. If it is assumed that the frequency offset value of user 1 is offset1 and the frequency offset value of user 2 is offset2, the difference in the frequency offset can be expressed as d_offset=offset1−offset2. When the value of d_offset is large, this means that the signal of user 1 and the signal of user 2 overlap with each other, producing interference. When d_offset exceeds an offset threshold, a null signal is assigned between user 1 and user 2. In this case, the values of offset1 and −offset2 are compared and some subcarriers of the subcarrier group having a greater value are assigned to null signals. Furthermore, when both offset1 and −offset2 have positive values, it is possible to assign some subcarriers of the subcarrier group assigned to both users to null signals according to the size thereof. For example, when offset1 is 10 kHz and offset2 is −20 kHz, it is possible to assign one null signal to user 1 and two null signals to user 2. By so doing, it is possible to reduce interference between user 1 and user 2.

As described above, the users' moving speed information includes information on the users' moving speeds. When the users' moving speeds are high, the amount of Doppler shift increases and a deviation in the frequency domain is produced. This deviation may cause interference with other adjacent users on both sides of a certain user. When the users' moving speeds exceed a moving speed threshold, null signals are assigned to a part of subcarriers adjacent to the other users (both sides or one side) of the subcarriers assigned to this user. By so doing, it is possible to reduce interference with the other users adjacent to this user.

The communication quality information requested by a user includes information on the communication quality (e.g., throughput and amount of data delay) requested by the user. When the communication quality requested by the user is low, influences of deterioration in the throughput due to assignment of null signals to a part of subcarriers assigned are also small. Thus, for users for whom the requested communication quality is lower than the communication quality threshold, null signals are assigned to a part of subcarriers close to adjacent users beforehand. By so doing, it is possible to reduce interference with the users adjacent to this user.

As described above, the received signal power information for each user includes information on the received signal power of each user. When the power of a certain user is greater than that of other adjacent users, the influence of the user on the other users also increases. When user 1 and user 2 are users adjacent to each other, the received signal power of user 1 is power1 and the received signal power of user 2 is power2, if the absolute value of power difference power1–power2 exceeds a power threshold, some subcarriers of the subcarrier group assigned to the user having greater power are assigned to null signals. However, power1 and power2 used to calculate a power difference may be average power of all subcarriers or average power of mutually adjacent subcarriers. For example, when subcarriers 1 to 10 are assigned to user 1 and subcarriers 11 to 20 are assigned to user 2, average power of 1 to 10 may be designated as power1, average power of 11 to 20 as power2, or average power of 9 and 10 as power1, and average power of 11 and 12 as power2, or average power of 10 may be designated as power1, power of 11 as power2. By so doing, it is possible to reduce interference produced when a power difference between neighboring users is large.

As described above, the information on the amount of interference among users includes interference among users. When it is assumed that of the subcarriers used by certain user, EVM (Error Vector Magnitude) of subcarriers adjacent to subcarriers assigned to an other user adjacent to a certain user on the frequency domain is first EVM and EVM of the remaining subcarriers of subcarriers used by the certain user is second EVM, the amount of interference among users can be estimated by calculating a difference between the first EVM and second EVM. When the difference between the first EVM and second EVM exceeds an EVM threshold (error vector threshold), null signals are assigned to a part of the subcarriers adjacent to the other user. When there are a plurality of other users, the above described processing is carried out on each of them separately. By so doing, it is possible to realize communications while avoiding subcarriers with more interference and thereby reduce interference.

Here, an example of the case where information indicating various communication states is used independently has been explained, but it is also possible to carry out effective control over null signals using these different pieces of information in combination.

For example, it is also possible to increase/decrease the value of the offset threshold described in the explanation of the carrier frequency information according to users' moving speed information, communication quality information requested by the user and received signal power information for each user and make a judgment using the increased/decreased value of the offset threshold. For example, when the moving speed of a user is high, the offset threshold is reduced accordingly. When the communication quality requested by the user is low, the offset threshold is reduced accordingly. When the reception power of the user is high, the offset threshold is reduced accordingly.

As another example thereof, when assigning null signals by using users' carrier frequency information, it is also possible to preferentially assign null signals to subcarriers of a user requesting low communication quality or subcarriers assigned to a user having greater reception power, irrespective of which is greater or smaller between the amount of offset of the carrier frequency of this user and the amount of offset of the carrier frequency of the other user.

As a further example thereof, it is possible to calculate a weighted sum total of a plurality of pieces of communication state information and assign null signals when the weighted sum total exceeds a sum total threshold.

Figure 14:
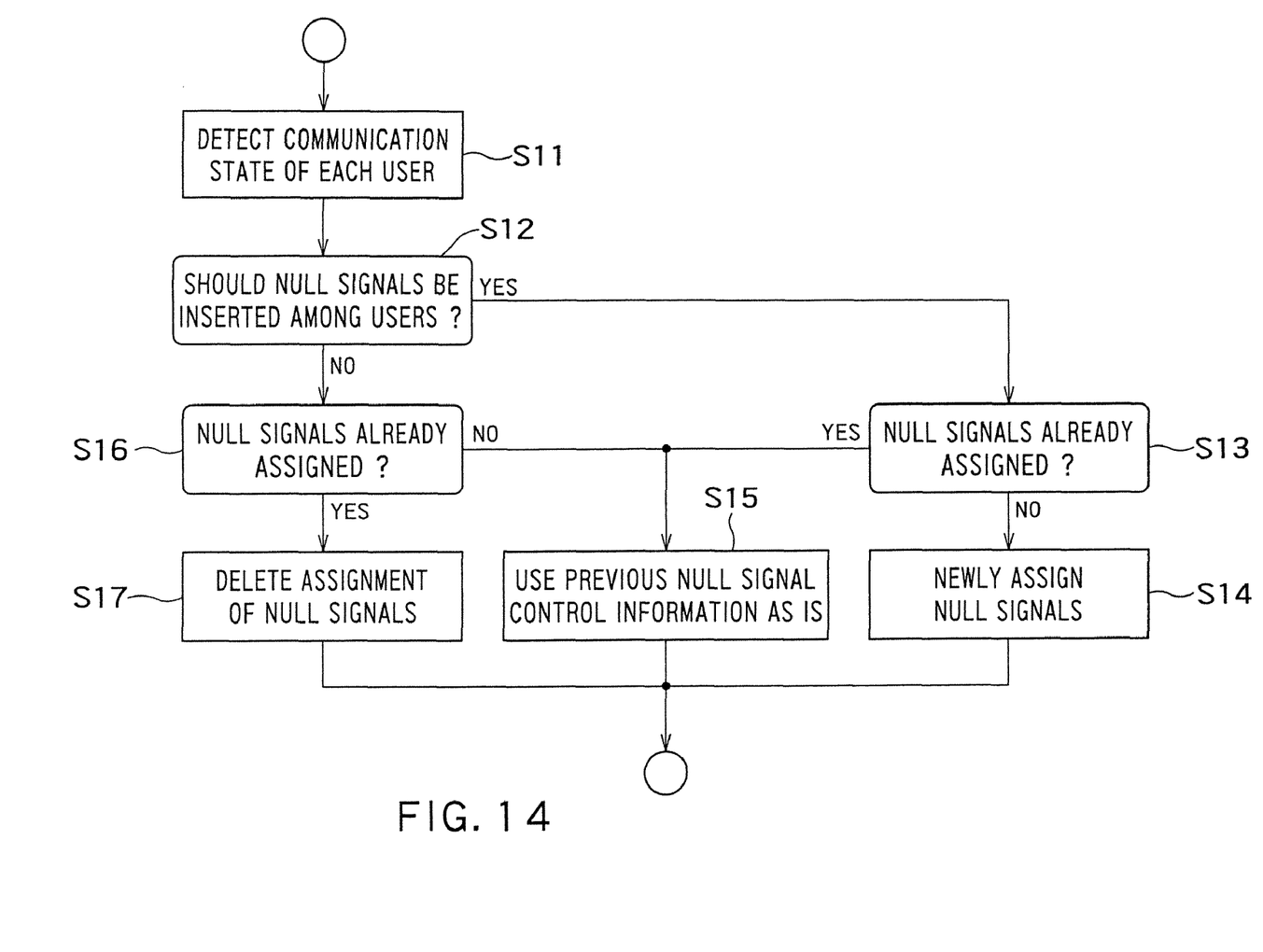
FIG. 14 is a flow chart showing a flow of processing of generating null signal control information.

FIG. 14 is a flow chart showing a flow of processing of generating null signal control information by the null signal control information generator 16 using the communication states of the respective users.

When the null signal control information generator 16 acquires the communication states of the respective users from the communication state detector 15 (S11), it judges whether or not null signals should be inserted between the users using the above described technique (S12).

When null signals need to be inserted between the users (YES in S12), it is examined whether or not null signals have already been assigned to the subcarriers to which the null signals should be assigned (S13) and when no null signals have not been assigned yet, it is determined that null signals will be newly assigned (S14). When null signals have already been assigned, the previous null signal control information is used without changing (S15).

In S12, if null signals need not be inserted between the users (NO in S12), it is examined whether or not there are subcarriers to which null signals have already been assigned (S16). When there are such subcarriers (YES in S16), the assignment of null signals to those subcarriers is deleted (S17) and when there are no such subcarriers, the previous null signal control information is used without changing (S15).

The invention claimed is:
1. A base station using an OFDMA (Orthogonal Frequency Division Multiple Access) scheme for uplink communication from a plurality of radio terminals, comprising:
 a mapping information generator configured to generate mapping information indicating subcarriers assigned to the radio terminals for communications depending on the OFDMA scheme;
 a first transmitter configured to transmit the mapping information to the radio terminals;
 a receiver configured to receive OFDM signals from the radio terminals;
 a communication state detector configured to detect communication states of the radio terminals from the mapping information and the OFDM signals received from the radio terminals;
 a null information generator configured to
  determine whether or not null signals should be assigned to a part of the subcarriers assigned to the radio terminals from the communication states of the radio terminals and the mapping information,
  specify subcarriers to which null signals are to be assigned when it is determined that null signals should be assigned and
  generate null information for instructing to assign null signals to the specified subcarriers;

a second transmitter configured to transmit the null information to the radio terminals determined to assign null signals; and an FFT section which performs a fast Fourier transform on a set of the OFDM signals received by the receiver from the radio terminals to get subcarrier signals;

wherein the communication state detector detects subcarrier signals of each radio terminal based on the mapping information and detects communication states of each radio terminal from detected subcarrier signals of each radio terminal, the communication state detector detects an offset value indicating how far and in which direction the frequencies of subcarriers assigned to the radio terminal are deviated from proper frequencies as a communication state of the radio terminal, and when a difference between the offset value of the radio terminal and an offset value of a radio terminal adjacent to the radio terminal on the frequency domain exceeds an offset threshold, the null information generator determines to assign null signals to a part of subcarriers assigned to at least one of the radio terminal and the adjacent radio terminal.

2. The base station according to claim 1, wherein the null information generator determines the number of subcarriers to which null signals are assigned for the radio terminal and the adjacent radio terminal respectively based on the magnitude of the offset value detected for the radio terminal and the magnitude of the offset value detected for the adjacent radio terminal.

3. The base station according to claim 1, further comprising an IDFT (Inverse Discrete Fourier Transform) section configured to perform an inverse discrete Fourier transform on subcarrier signals of each radio terminal, wherein the communication state detector detects an offset value indicating how far and in which direction the frequencies of subcarriers assigned to the radio terminal are deviated from proper frequencies as a communication state of the radio terminal on the basis of signals of the radio terminal obtained by the IDFT section, and when a difference between the offset value of the radio terminal and an offset value of a radio terminal adjacent to the radio terminal on the frequency domain exceeds an offset threshold, the null information generator determines to assign null signals to a part of subcarriers assigned to at least one of the radio terminal and the adjacent radio terminal.

4. The base station according to claim 1, further comprising a filter configured to separate a set of the OFDM signals received by the receiver from the radio stations into signals for each the radio terminal, wherein the communication state detector detects an offset value indicating how far and in which direction the frequencies of subcarriers assigned to the radio terminal are deviated from proper frequencies as a communication state of the radio terminal on the basis of signals of the radio terminal obtained by the filter, and when a difference between the offset value of the radio terminal and an offset value of a radio terminal adjacent to the radio terminal on the frequency domain exceeds an offset threshold, the null information generator determines to assign null signals to a part of subcarriers assigned to at least one of the radio terminal and the adjacent radio terminal.

5. The base station according to claim 1, wherein the communication state detector detects moving speeds of the radio terminals as communication states of the radio terminals, and the null information generator determines to assign null signals to a part of the subcarriers assigned to radio terminals whose moving speed exceed a moving speed threshold.

6. The base station according to claim 1, wherein the communication state detector detects communication quality requested by the radio terminals as communication states of the radio terminals, and the null information generator determines to assign null signals to a part of the subcarriers assigned to radio terminals whose communication quality is lower than a communication quality threshold.

7. The base station according to claim 1, wherein the communication state detector detects reception levels of the subcarriers assigned to the radio terminals as communication states of the radio terminals, and when a difference between the reception level of the radio terminal and the reception level of the radio terminal adjacent to the radio terminal on the frequency domain exceeds a reception level threshold, the null information generator determines to assign null signals to a part of the subcarriers assigned to the radio terminal of higher reception level.

8. The base station according to claim 7, wherein the communication state detector detects average reception levels of all or a part of the subcarriers assigned to the radio terminals.

9. The base station according to claim 1, wherein the communication state detector detects interference levels of the radio terminals with other radio terminals adjacent to the radio terminals on the frequency domain as communication states of the radio terminals, and the null information generator determines to assign null signals to a part of the subcarriers assigned to radio terminals whose interference levels exceeds an interference threshold.

10. The base station according to claim 9, wherein the communication state detector detects error vector magnitude of first subcarriers adjacent to subcarriers assigned to the other radio terminal among the subcarriers assigned to the radio terminal and error vector amplitude of second subcarriers other than the first subcarriers among the subcarriers assigned to the radio terminal, and when a difference between the error vector amplitude of the first subcarriers and the error vector amplitude of the second subcarriers exceeds an error vector threshold, the null information generator determines to assign null signals to a part of the first subcarriers.

11. The base station according to claim 1, wherein when it is determined that null signals need not be assigned to the subcarriers of radio terminals and null signals have already been assigned to a part of the subcarriers of the radio terminals, the null information generator generates null information including instructions for instructing to cancel assignment of the null signals, and the second transmitter transmits the null information to the radio terminals.

12. The base station according to claim 1, wherein the first transmitter transmits the mapping information with a lower frequency than the frequency with which the second transmitter transmits the null information.

13. The base station according to claim 1, wherein the null information generator specifies subcarriers adjacent to subcarriers of an other radio terminal among subcarriers assigned to the radio terminal for which it is determined that null signals should be assigned, as subcarriers to which null signals should be assigned.

14. A radio communication method using an OFDMA scheme for uplink communication from a plurality of radio terminals to a base station, comprising:

receiving OFDM signals from the radio terminals;

detecting communication states of the radio terminals based on mapping information indicating assignment of subcarriers to the radio terminals and OFDM signals received from the radio terminals;

determining whether or not null signals should be assigned to a part of the subcarriers assigned to the radio terminals from detected communication states of the radio terminals; and specifying subcarriers to which null signals are to be assigned when t is determined that null signals should be assigned and;

generating null information for instructing to assign null signals to the specified subcarriers;

transmitting the null information to the radio terminals determined to assign null signals;

performing a fast Fourier transform on a set of the OFDM signals received by the receiver from the radio terminals to get subcarrier signals; wherein the detecting communication states includes detecting subcarrier signals of each radio terminal based on the mapping information and detecting communication states of each radio terminal from detected subcarrier signals of each radio terminal, and detecting an offset value indicating how far and in which direction the frequencies of subcarriers assigned to the radio terminal are deviated from proper frequencies as a communication state of the radio terminal; and the generating null information includes, when a difference between the offset value of the radio terminal and an offset value of a radio terminal adjacent to the radio terminal on the frequency domain exceeds an offset threshold, determining to assign null signals to a part of subcarriers assigned to at least one of the radio terminal and the adjacent radio terminal.

* * * * *